Patented July 22, 1952

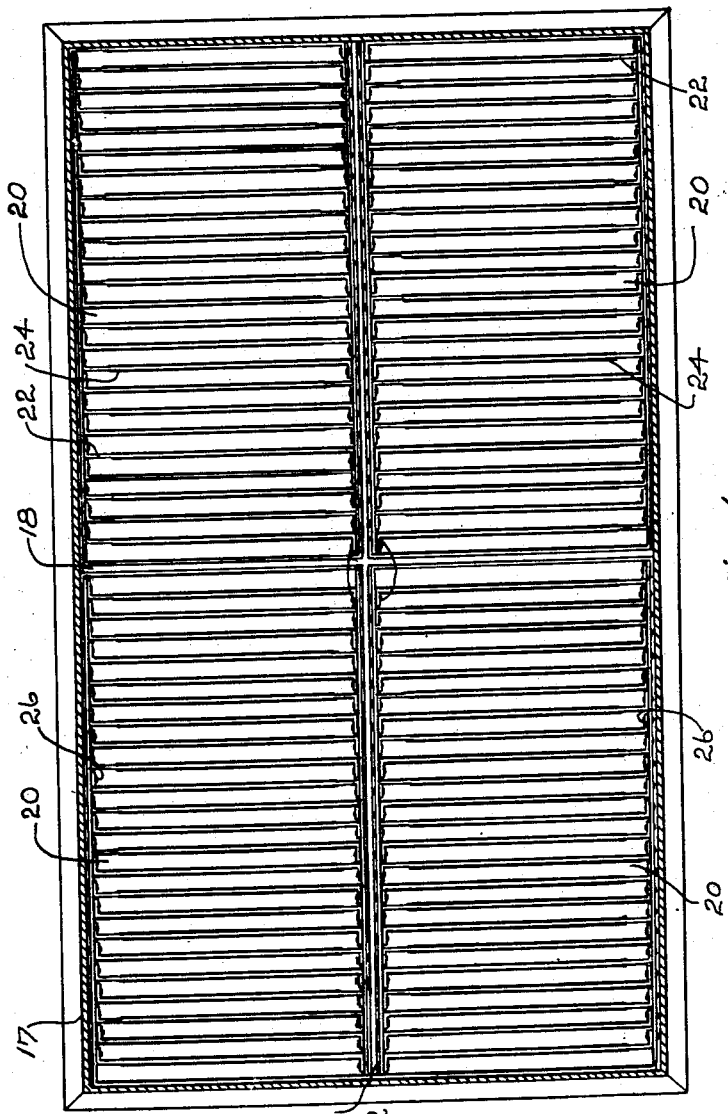
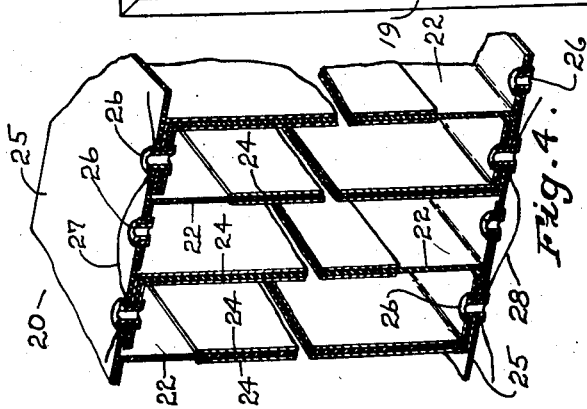

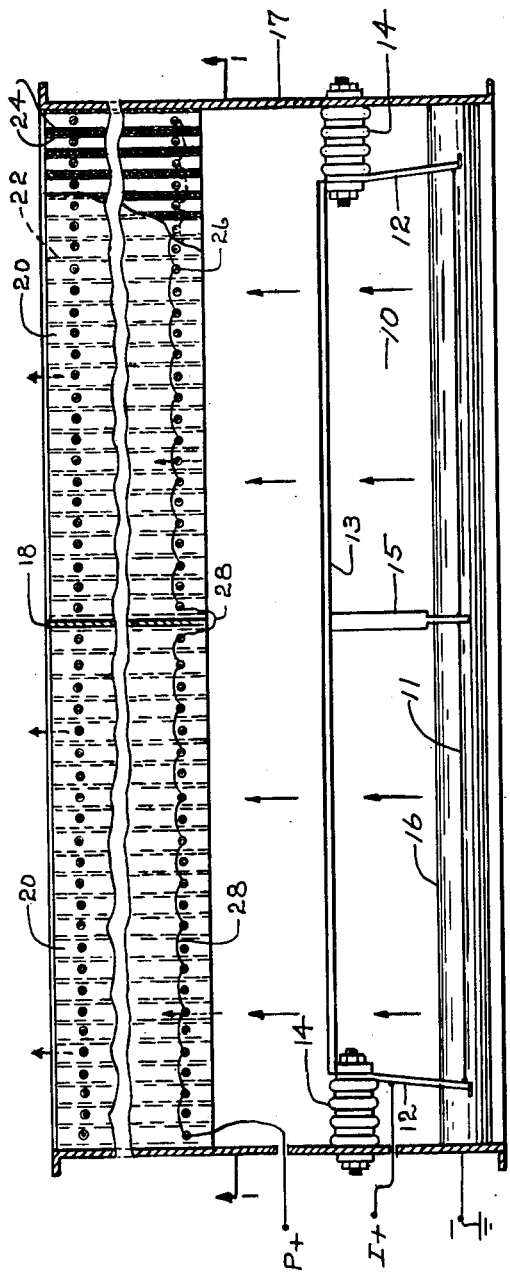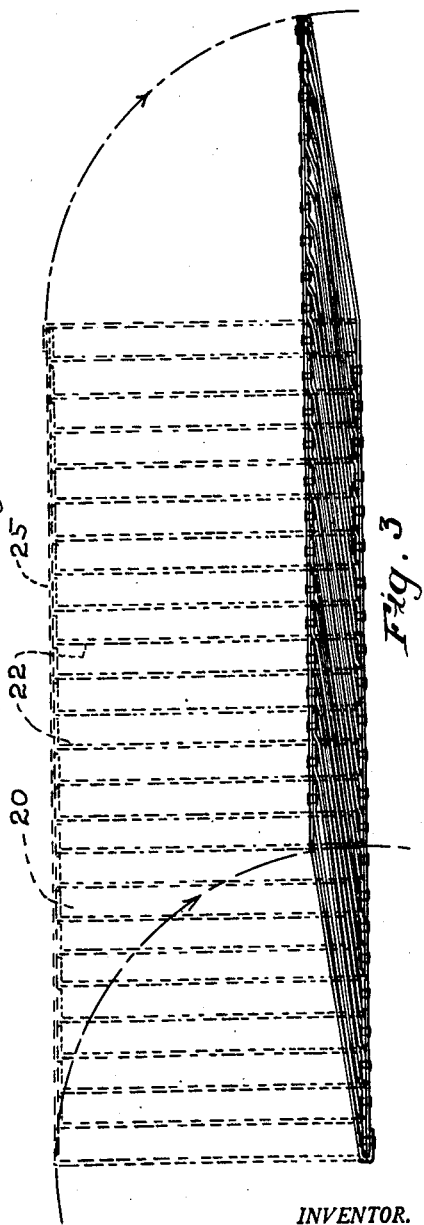

2,604,183

UNITED STATES PATENT OFFICE 2,604,183

ELECTROSTATIC PRECIPITATOR

Earl L. Richardson, Hyde Park, Mass., assignor, by mesne assignments, to Westinghouse Electric Corporation, a corporation of Pennsylvania Continuation of application Serial No. 693,215, August 27, 1946. This application October 1, 1948, Serial No. 52,289

10 Claims. (Cl. 183—7)

This invention relates to electrostatic precipitators for removing dust and other small particles from gases such as air.

This application is a continuation of my copending application, Serial No. 693,215, which was filed August 27, 1946, now abandoned.

A successful type of electrostatic precipitator is disclosed in the G. W. Penney, U. S. Patent No. 2,181,767. Such a precipitator has an ionizing chamber in which the gas to be cleaned is ionized whereby the particles carried thereby are given electrostatic charges, and has a collector chamber containing charged collector plates to which the particles are attracted and to which they adhere. Usually the collector plates of such a precipitator are cleaned at intervals as by being washed down with water or a flushing oil.

This invention provides a disposable collector cell which is of inexpensive construction, and which can be easily removed after a period of use, and replaced. The cost of the cell is so small that it is economical to throw the used ones away. In one embodiment of the invention, the collector cell comprises a plurality of spaced collector plates of inexpensive, flexible, sheet insulating material coated on their adjacent surfaces with a conductive material for forming electrodes, the ends of the plates being attached to similar flexible sheets of insulating material, the cell being collapsible whereby it can be shipped and stored in a small space.

An object of the invention is to provide a simple, inexpensive collector cell for an electrostatic precipitator.

Another object of the invention is to provide a disposable collector cell for an electrostatic precipitator.

Another object of the invention is to provide a collector cell in an electrostatic precipitator, which can be readily collapsed for convenience in shipment and storage.

The invention will now be described with reference to the drawing, of which:

Fig. 1 is an end elevation, in section, of an electrostatic precipitator embodying this invention; the section being taken along the lines 1—1 of Fig. 2;

Fig. 2 is a plan view, partially in section, of the precipitator.

Fig. 3 is a view illustrating how the collector-cell of Figs. 1 and 2 can be collapsed, and Fig. 4 is an enlarged, projected view of a portion of the collector-plate assembly, illustrating constructional details.

Referring first to Figs. 1 and 2, the precipitator includes an ionizing chamber 10 having the conventional ionizer wires 11 suspended between the rigid end supports 12 which are carried by a skeleton framework 13 which in turn, is supported from the insulators 14. The wires 11 are supported at their longitudinal centers by the supports 15 of the framework 13. The tubular electrodes 16 extend between the wires 11 and parallel thereto, and are grounded to the cabinet 17. The construction of the ionizer chamber is similar to that described in more detail in the said Penney patent.

This invention provides in a multi-cell collector chamber, the two insulating partitions 18 and 19 (Fig. 1), which extend across the interior of the cabinet 17 downstream with respect to gas flow, of the ionizing chamber 10, and which divide the precipitating space within the cabinet into four compartments, each containing one of the collector cells 20. The cells 20 are slidable into and removable from the cabinet at the rear thereof (Fig. 2), and each fills one of the described compartments as illustrated by Figs. 1 and 2.

Each cell comprises the plurality of spaced, vertically extending walls 22 of sheet, electric insulating material, having their ends extending perpendicular thereto, the opposite ends extending in opposite directions as illustrated by Figs. 1 and 4. The walls 22 have both sides coated with sheets of electric conducting material 24. On alternate walls, the coating 24 is omitted from the lower ends and from a portion of the vertical space above the lower ends. On the other walls, the coating 24 is omitted from the upper ends and from a portion of the vertical space below the upper ends.

The walls 25 of sheet electric insulating material extend across the ends of the walls 22 and are connected to the wall ends by the rivets 26. The wires 27 interconnect the rivets 26 which extend through the upper, coated wall ends. The wires 27 are grounded to the cabinet 19, and the wires 28 are adapted to be connected to a positive terminal of which may be a 12,000 volt terminal, of a conventional direct current power supply which is not illustrated. I+ on Fig. 2 of the drawing indicates the connection of the ionizer wires 11 to the power supply, and P+ indicates the connection of the wires 28 to a positive terminal which may be a 6,000 volt terminal, of the power supply, the negative terminal marked — being connected to the negative side of the power supply and to ground.

The walls of the cell may be formed from any fairly stiff, non-conducting sheets such as Kraft or Bristol board paper or thin cardboard. The conductive coatings may be aluminum or other metal foil cemented to the walls, may be formed by spraying metal particles upon the walls, or may be formed by impregnating the walls with metal particles. The walls of the cell shown by Fig. 1 should be sufficiently stiff that the collector plates will remain, when in place in the collector chamber, substantially parallel.

In operation the air or other gas, entering the cabinet 19 as shown by the arrows indicating gas flow, is first ionized in the ionizing chamber 10 so as to charge positively the particles which are suspended in the incoming gas. The gas then passes between the conducting coatings 24 on the cell walls 22 where the charged particles are attracted to the grounded coatings.

The gas to be cleaned may be moved through the precipitator by a blower which is not illustrated, but which can be connected, as is conventional, to either the gas entering end or the gas leaving end of the cabinet.

When the precipitating electrodes of the cells 20 become dirty, the cells can be slid out of the precipitator and can be thrown away, being replaced with new ones, their cost being so slight that it is not worth while attempting to clean them.

While one embodiment of the invention has been described for the purpose of illustration, it should be understood that the invention is not limited to the exact apparatus and arrangements of apparatus illustrated, as modifications thereof may be suggested by those skilled in the art without departure from the essence of the invention.

What is claimed is:

1. A collector cell for an electrostatic precipitator comprising a plurality of spaced, substantially parallel walls of electric insulating material; electric conducting material on the opposite sides of said walls; the conducting material on each wall being insulated from that on the adjacent walls; means interconnecting the conducting material on the opposite sides of each of said walls, and means interconnecting the conducting material on alternate walls.

2. A collector cell as claimed in claim 1 in which the walls are flexible and the cell is collapsible as for storage and shipment.

3. A collector cell for an electrostatic precipitator comprising a plurality of spaced, substantially parallel walls of electric insulating material; electric conducting material on opposite sides of said walls; means interconnecting the conducting material on the opposite sides of each of said walls; the conducting material on each wall being insulated from that on the adjacent walls; walls of insulating material interconnecting opposite ends of said walls, and means interelectrically connecting the conducting material on alternate parallel walls.

4. A collector cell according to claim 3 in which the said walls are flexible and in which the walls at their ends are flexible members, whereby the cell can be collapsed as for shipment and storage.

5. A collector cell for an electrostatic precipitator comprising a plurality of spaced, substantially parallel walls of electric insulating material; electric conducting material on said walls; end walls of electric insulating material interconnecting the ends of said walls; the conducting material on each parallel wall being insulated from that on the adjacent parallel walls, means including conducting material on one of said end walls, interconnecting the conducting material on alternate parallel walls, and means including conducting material on the other of said end walls interconnecting the conducting material on the others of said parallel walls.

6. A collector cell according to claim 5 in which the said walls are flexible whereby the cell can be collapsed as for storage and shipment.

7. A collector cell for an electrostatic precipitator comprising a plurality of spaced, substantially parallel walls of electric insulating material; said walls having ends extending substantially perpendicular thereto with opposite ends extending in opposite directions, electric conducting material on said walls; end walls of electric insulating material interconnecting said ends; and means interconnecting the conducting material on alternate walls.

8. A collector cell according to claim 7 in which all of said walls are flexible whereby the cell can be collapsed as for storage and shipment.

9. A collector cell for an electrostatic precipitator comprising a plurality of spaced, substantially parallel sheets of electric insulating material extending crosswise of said cell; said sheets having ends at one side of said cell, extending substanially perpendicular to said sheets in one direction, and having ends at the opposite side of said cell, extending substantially perpendicular to said sheets in the opposite direction, alternate of said sheets having electric conducting material on opposite sides thereof and on their ends at said one side of said cell but being free of conducting material on their ends at said one side of said cell; said sheets of electric insulating material interconnecting said ends of said spaced sheets; and means interconnecting at said side sheets; the conducting material on alternate of said spaced sheets.

10. A collector cell according to claim 9 in which all of said sheets are flexible whereby the cell can be collapsed as for shipment and storage.

EARL L. RICHARDSON.

REFERENCES CITED

The following references are of record in the file of this patent:

UNITED STATES PATENTS

| Number | Name | Date |
|---|---|---|
| 1,992,113 | Anderson | Feb. 19, 1935 |
| 1,992,974 | Thompson | Mar. 5, 1935 |
| 2,085,735 | Brion et al. | July 6, 1937 |
| 2,347,709 | Penney | May 2, 1944 |
| 2,359,149 | Pegg | Sept. 26, 1944 |

FOREIGN PATENTS

| Number | Country | Date |
|---|---|---|
| 467,823 | Great Britain | June 31, 1937 |
| 360,119 | Germany | Sept. 29, 1922 |